US012480350B2

(12) United States Patent
Dörnen et al.

(10) Patent No.: US 12,480,350 B2
(45) Date of Patent: Nov. 25, 2025

(54) DRIVE DEVICE FOR AN ADJUSTABLE VEHICLE FLAP

(71) Applicant: Edscha Engineering GmbH, Remscheid (DE)

(72) Inventors: Jörg Dörnen, Remscheid (DE); Peter Mrowka, Remscheid (DE); Christian Bartschies, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 482 days.

(21) Appl. No.: 17/875,351

(22) Filed: Jul. 27, 2022

(65) Prior Publication Data

US 2023/0041203 A1 Feb. 9, 2023

(30) Foreign Application Priority Data

Aug. 3, 2021 (DE) .......................... 102021120210.8

(51) Int. Cl.
  *E05F 15/622* (2015.01)
  *F16H 25/24* (2006.01)
(52) U.S. Cl.
  CPC ....... *E05F 15/622* (2015.01); *F16H 25/2454* (2013.01); *E05Y 2201/21* (2013.01);
  (Continued)
(58) Field of Classification Search
  CPC ...... F16D 55/38; F16H 25/20; F16H 25/2454; F16H 57/0006; F16H 2001/2881;
  (Continued)

(56) References Cited

U.S. PATENT DOCUMENTS

| 11,067,156 B1 * | 7/2021 | Heiberger ............ F16H 25/2454 |
| 2010/0186528 A1 * | 7/2010 | Hillen ..................... F16D 7/048 |
| | | 192/56.6 |

(Continued)

FOREIGN PATENT DOCUMENTS

| CN | 107842275 A * | 3/2018 | ............ E05F 15/622 |
| CN | 109113481 A | 1/2019 | |

(Continued)

OTHER PUBLICATIONS

English machined translation of CN-107842275-A, Mar. 27, 2018.*

*Primary Examiner* — Robert A. Siconolfi
*Assistant Examiner* — San M Aung
(74) *Attorney, Agent, or Firm* — Davidson Kappel LLC

(57) ABSTRACT

A drive device, in particular for an adjustable vehicle flap, comprising includes a housing extending axially along a drive axle, a motor for generating a driving force in the direction of the drive axle, a first drive element, and a coupling device arranged between the motor and the first drive element. The coupling device comprises a coupling housing and at least one first coupling part with a coupling section for coupling to the first drive element. The first drive element is coupled to the coupling device via the coupling section of the first coupling part, and a braking device for braking a drive movement of the first drive element. A drive device, in particular for an adjustable vehicle flap, which has a lower residual installation length and can thus be used more flexibly in various installation space situations is created by the braking device being arranged axially in the coupling section of the first coupling part.

18 Claims, 2 Drawing Sheets

(52) U.S. Cl.
CPC ... *E05Y 2201/476* (2013.01); *E05Y 2201/702* (2013.01); *E05Y 2201/726* (2013.01)

(58) Field of Classification Search
CPC ..... F16H 2025/2075; F16H 2025/2087; F16H 2057/02082; E05F 3/16; E05F 15/622; E05Y 2201/21; E05Y 2201/72; E05Y 2201/696; E05Y 2201/702; E05Y 2201/726; E05Y 2800/205; E05Y 2800/232; E05Y 2800/268; E05Y 2800/414; E05Y 2800/422; E05Y 2900/531; E05Y 2900/546
USPC .......................................................... 188/266
See application file for complete search history.

(56) References Cited

U.S. PATENT DOCUMENTS

| | | | |
|---|---|---|---|
| 2013/0169087 A1 | 7/2013 | Kummer | |
| 2014/0232225 A1 | 8/2014 | Heinze et al. | |
| 2019/0169901 A1 | 6/2019 | Yamagata et al. | |
| 2020/0217118 A1* | 7/2020 | Wirth | E05F 15/622 |
| 2020/0308892 A1 | 10/2020 | Kummer | |
| 2020/0408024 A1* | 12/2020 | Kummer | B60J 5/106 |
| 2021/0054889 A1 | 2/2021 | Bals et al. | |
| 2023/0175560 A1 | 6/2023 | Isobe et al. | |

FOREIGN PATENT DOCUMENTS

| | | | | |
|---|---|---|---|---|
| CN | 111021866 A | 4/2020 | | |
| CN | 111119644 A | 5/2020 | | |
| CN | 112065207 A | 12/2020 | | |
| DE | 102007037128 A1 | 2/2009 | | |
| DE | 202011106110 U1 | 3/2013 | | |
| DE | 102015009717 A1 | 2/2017 | | |
| DE | 202018101761 U1 * | 4/2018 | | F16D 55/38 |
| DE | 102017101325 A1 | 7/2018 | | |
| DE | 112017003930 T5 | 4/2019 | | |
| DE | 102017128389 A1 | 6/2019 | | |
| DE | 102019130423 A1 | 5/2021 | | |
| DE | 102020105716 B3 * | 6/2021 | | E05F 15/622 |
| EP | 2196701 A2 | 6/2010 | | |
| EP | 2669458 A2 | 12/2013 | | |
| EP | 4006289 A1 | 6/2022 | | |
| WO | WO2012007551 A1 | 1/2012 | | |
| WO | WO2020208878 A1 | 10/2020 | | |

* cited by examiner

DRIVE DEVICE FOR AN ADJUSTABLE VEHICLE FLAP

The present disclosure relates to a drive device, in particular for an adjustable vehicle flap, the drive device comprising a housing, wherein the housing extends axially along a drive axle, a motor for generating a driving force in the direction of the drive axle, a first drive element and a coupling device arranged between the motor and the first drive element, wherein the coupling device comprises a coupling housing and at least one first coupling part with a coupling section for coupling to the first drive element, wherein the first drive element is coupled to the coupling device via the coupling section of the first coupling part. Furthermore, the drive device comprises a braking device for braking a drive movement of the first drive element.

BACKGROUND

Known from practice are drive devices, in particular for driven, adjustable vehicle flaps, which longitudinally extend along a drive axle and generate a driving force in the direction of the drive axle, wherein known drive devices for driving a driven, adjustable vehicle flap are generally connected for this purpose in an articulated manner between a vehicle body and the vehicle flap to be adjusted and provide a corresponding driving force by driven adjustment of their length. Such drive devices are usually designed as spindle drives, as they can generate sufficient force in the direction of the drive axle due to the existing spindle-spindle nut gear and are very reliable and precise.

In order to ensure an adjustment that is as accurate as possible, known drive devices often have a braking device, which serves to bring a drive element, in particular either the spindle rod or the spindle nut, as quickly as possible into a stationary position after the drive unit driving said drive element has been switched off, and to thus quickly stop the adjustment movement. In addition, known drive devices also have coupling devices or torque-limiting devices which serve for operational safety. In particular they are intended to prevent the components present in a drive train of the drive device from being damaged by external forces or the vehicle flap driven by the drive device from causing greater damage to persons standing outside, in particular through jamming and the like. As a result of the arrangement of the additional devices, in particular the braking device in combination with the coupling device, the drive device generally requires a certain minimum installation space, in particular in the direction of the drive axle, in order to accommodate the corresponding additional braking devices or also coupling- and/or torque-limiting devices so that, due to the design, a certain residual installation length of the drive device always remains, which accordingly cannot be undershot. Disadvantageously, drive devices, depending upon the existing geometry of the vehicle flap or the vehicle body, possibly cannot be optimally connected, since the residual installation length may be too large for optimal installation.

DE 20 2011 106 110 U1 shows a drive device for a vehicle flap, comprising a housing part, a drive-side coupling element, which is provided for coupling to a drive motor via an intermediate gear, and an output-side coupling element, which is provided for coupling to a spindle rod of a spindle-spindle nut gear. The drive device further comprises a motor for generating a driving force in the direction of a drive axle, and a first drive element designed as a spindle rod, wherein a coupling device is arranged between the motor and the first drive element. The coupling device comprises a coupling housing and a first coupling part with a coupling section for coupling to the first drive element. Furthermore, the drive device comprises a braking device for braking a driven movement of the spindle rod. In this case, the braking device comprises a first brake element, which is connected to the coupling part in a rotationally-fixed manner, and a second brake element, which is arranged in a rotationally-fixed manner in relation to the coupling housing, wherein the first brake element comprises a pin-shaped section and is hollow-cylindrical, and the second brake element is designed as a brake disk. The second brake element is biased against the coupling housing by a biasing means designed as a helical compression spring. A disadvantage of the drive device shown is that the braking device axially takes up a rather large installation space in the coupling device and that the residual installation length of the drive device is thus possibly too large for use in certain vehicle bodies or vehicle flaps.

DE 10 2017 101 325 A1 shows a drive device for the motorized adjustment of a vehicle flap, comprising a coupling housing and a coupling device or braking device, wherein the braking device is accommodated in the coupling housing. The braking device comprises two connection elements, wherein one of the two connection elements is coupled to a drive motor, and the other of the two connection elements is coupled to a drive element designed as a spindle rod. Friction elements or brake elements are provided between the two connection elements and cause a frictional coupling of the two connection elements. A disadvantage of the drive device shown is that the coupling device or the braking device requires several connection elements and thus requires a relatively large amount of installation space in the direction of the drive axle, and therefore increases the residual installation length.

DE 10 2020 105 716 B3 shows a drive device for an adjustable vehicle flap. The drive device comprises a housing which extends axially along a drive axle. The drive device further comprises a coupling device arranged between a motor and a first drive element designed as a spindle rod, wherein the coupling device comprises at least one first coupling part designed as an adapter sleeve with a coupling section designed as an internal toothing for coupling to the first drive element, wherein the first drive element is coupled to the coupling device via the coupling section of the first coupling part. Furthermore, the drive device comprises a braking device designed as a multi-disk brake for braking the first drive element. The braking device and the coupling section or the coupling device partially overlap in this case. The provision of both a braking device and a coupling device disadvantageously results in an increase in the axial extent or the residual installation length of the drive device.

SUMMARY

It is an aim of the present disclosure to provide a drive device, in particular for an adjustable vehicle flap, which has a lower residual installation length and can thus be used more flexibly in various installation space situations.

According to one aspect of the present disclosure, a drive device, in particular for an adjustable vehicle flap, is provided, comprising a housing, wherein the housing extends axially along a drive axle. The drive device further comprises a motor for generating a driving force in the direction of the drive axle, a first drive element, and a coupling device arranged between the motor and the first drive element, wherein the coupling device comprises a coupling housing and at least one first coupling part with a coupling section for coupling to the first drive element. The first drive element is coupled to the coupling device via the coupling section of the first coupling part. Furthermore, the drive device comprises a braking device for braking a drive movement of the first drive element. The drive device is characterized in that the braking device is arranged axially in the coupling section of the first coupling part. Advantageously, the residual installation length of the drive device is not increased by the additionally present braking device, so that, in addition to a torque-limiting function or a gear function provided by the coupling device, a braking function can additionally be provided without increasing the axial extent of the drive device.

In a particularly preferred embodiment, it is provided that the braking device radially surrounds the coupling section. Advantageously, the radial extent of the braking device is not too small, so that sufficient braking torques are achieved, and the components present in the braking device can be easily replaced.

The braking device expediently comprises a first brake element, wherein the first brake element is mounted in the coupling housing rotatably about the drive axle. In an advantageous development, the braking device comprises a second brake element, wherein the second brake element is arranged in a rotationally-fixed manner in the coupling housing and is coupled in a force-locking manner to the first brake element for generating a braking force. Advantageously, the frictional forces required for the braking force are provided by the two brake elements, so that only a replacement of the brake elements is required over time, while the coupling housing is not significantly subjected to wear during the generation of the braking forces.

In an advantageous development, it is provided that the braking device comprise a biasing means, which biases the first brake element and the second brake element axially against one another. Particularly preferably, the biasing means is designed as a disk spring. Advantageously, the braking force exerted by the braking device can be adjusted particularly precisely by adjusting the pretension exerted by the biasing means on the first brake element and the second brake element.

Preferably, the first brake element is coupled in a rotationally-fixed manner to the first coupling part in the coupling section. In an expedient embodiment, the first brake element is mounted together with the first coupling part rotatably about the drive axle in the coupling housing. Advantageously, the first brake element does not occupy any additional installation space in the axial direction of the drive device. The first brake element is driven together with the first drive element, which is likewise connected to the first coupling part in a rotationally-fixed manner, rotatably about the drive axle. When the motor is switched off, and thus at the end of a driven movement of the first drive element, the first brake element or the braking device acts directly on the remaining residual movement of the first drive element and brings about rapid braking of a remaining drive movement of the drive device due to inertia. In addition, the braking device also causes the vehicle flap to remain in the current position and not to move unintentionally.

In a particularly preferred embodiment, it is provided that the first brake element be designed as a brake disk. Advantageously, the first brake element has an annular brake surface which is particularly advantageously oriented to be perpendicular to the drive axle. Thus, a particularly effective braking of the first drive element or of the first coupling part is achieved. The first brake element can, further advantageously, be produced with high reliability and cost-effectively in large quantities and can also be easily replaced.

Particularly preferably, the coupling section of the first coupling part is designed to be hollow-cylindrical. This advantageously creates the possibility that, in the coupling section, both the coupling of the first coupling part to the first drive element and the coupling of the first coupling part to the braking device or the brake elements, which are to be displaced or rotated together with the first drive element, are carried out simultaneously on a limited axial section.

In an advantageous development, an inner spline for coupling to the first drive element and an outer spline for coupling to the braking device are provided in the coupling section of the first coupling part. Preferably, the inner spline is provided on an inner circumference of the hollow-cylindrical first coupling part, and the outer spline is provided on an outer circumference of the hollow-cylindrical first coupling part. This advantageously makes it possible for a corresponding counter coupling section of the first drive element to be in engagement with the inner spline of the first coupling part and for the outer spline to be in engagement with the braking device or the brake elements, which are to be mounted together with the first coupling part rotatably in the coupling housing.

In a particularly preferred embodiment, it is provided that the first brake element has an internal toothed ring, wherein the internal toothed ring meshes with the outer spline of the first coupling part. Advantageously, the first brake element is hereby connected to the first coupling part in a rotationally-fixed manner so that the first brake element is likewise also rotated during a driven rotational movement of the coupling part by means of the motor. The first brake element is, further advantageously, simultaneously displaceable axially in relation to the first coupling part, such that the first brake element can be displaced in particular by a biasing means in the direction of a second brake element so that a braking force that counteracts an unintentional rotational movement of the coupling part or of the first drive element connected in a rotationally-fixed manner to the coupling part can be adjusted.

In an expedient development, the first drive element has a counter coupling section. Advantageously, the counter coupling section is coupled to the coupling section of the first coupling part. Particularly preferably, an external knurling is provided in the counter coupling section of the first drive element. Advantageously, the external knurling of the counter coupling section of the first drive element is in engagement with an inner spline of the coupling section of the first coupling part. The counter coupling section is, particularly expediently, arranged at a first end of the first drive element. Advantageously, a rotationally-fixed connection between the first drive element and the first coupling part can be produced by pushing the first end of the first drive element or of the counter coupling section into the coupling section of the first coupling part.

Particularly preferably, the first drive element is designed as a spindle rod. The drive device advantageously comprises a second drive element, which is in engagement with the first drive element. Preferably, the second drive element is designed as a spindle nut so that a sufficiently large driving force can be generated in the direction of the drive axle by a driven rotation of either the spindle rod or the spindle nut.

In an advantageous development, a cover element is arranged at an open end of the coupling housing. The cover element is preferably designed as a stop part for the braking device, which is delimited on one side in the direction of the drive axle by the cover element. Particularly preferably, the cover element is designed as an injection-molded part made from a plastic that is non-transparent to laser. The cover element expediently has a smaller outer diameter than the hollow-cylindrical coupling housing, so that the cover element can be inserted into the open end of the coupling housing and can subsequently be fixed by laser welding. As an alternative to laser welding, however, it may also be provided for the cover element to be connected to the coupling housing by alternative material connections, for example, adhesive bonding. Furthermore, a form-fitting connection between the cover element and the coupling housing may also be provided as an alternative.

Particularly preferably, the braking device is clamped axially between the cover element and a bottom surface of the coupling housing. The bottom surface is preferably annular and is radially delimited inwards by a central opening in the coupling housing. Expediently, the biasing means, the first brake element, and the second brake element are clamped axially between the cover element and the bottom surface of the coupling housing. Advantageously, the components of the braking device can be inserted into the coupling housing, wherein the braking device is aligned in the coupling section of the first coupling part concentrically around the drive axle, and the braking force exerted by the braking device can be set by finally inserting the cover element, since the brake elements are biased with respect to one another by the clamping between the cover element and the bottom surface of the coupling housing.

Particularly preferably, the coupling device is designed as an intermediate gear. The intermediate gear expediently comprises several gear parts which are in engagement with one another, in order to bring about a transmission of a primary torque generated by a drive shaft of the motor into an output-side torque. In this case, the first coupling part is designed as a gearwheel which is arranged on the side, facing the first drive element, of the intermediate gear so that the output-side torque can be transferred to the first drive element by coupling the first coupling part to the first drive element. Alternatively, the coupling device is designed as a torque-limiting device.

BRIEF SUMMARY OF THE DRAWINGS

The present disclosure is explained in more detail below with reference to the appended drawings using a preferred exemplary embodiment.

DETAILED DESCRIPTION

Figure 1:
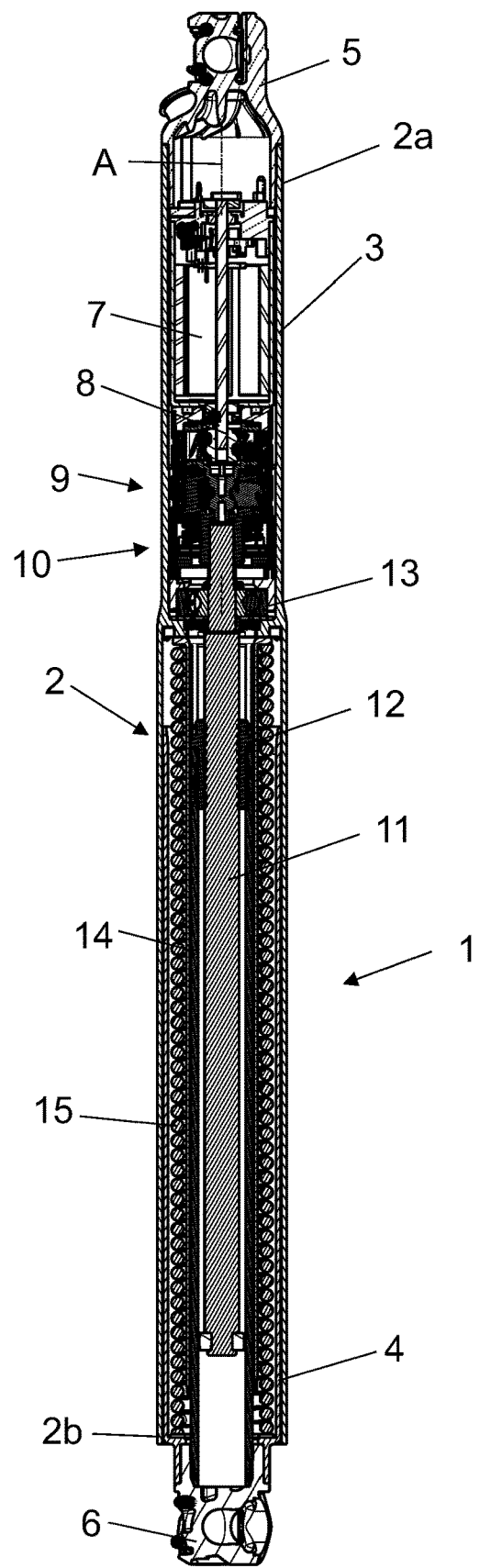
FIG. 1 shows a preferred exemplary embodiment of a drive device according to the present disclosure in a cross-sectional view.

FIG. 1 shows a preferred exemplary embodiment of a drive device 1 according to the present disclosure in a cross-sectional view. The drive device 1 comprises a telescopic drive housing 2 with a first housing part 3 and a second housing part 4, which are hollow-cylindrical and are plugged into one another so that they are axially displaceable in relation to one another along a drive axle A of the drive device 1, and the length of the drive housing 2 is thus adjustable. The drive device 1 further comprises a first connection element 5 which is fastened at the end side to the first housing part 3. The first connection element 5 is designed as a ball socket and is fastened in an open end of the first housing part 3 so that the first end 2a of the drive housing 2 can be connected in an articulated manner to either the vehicle body or the vehicle flap. The drive device further comprises a second connection element 6 arranged opposite the first connection element 5. The second connection element 6 is likewise designed as a ball socket and is fastened in an open end of the second housing part 4 so that a second end 2b of the drive housing 2 can be connected in an articulated manner to the other one of the vehicle body and the vehicle flap.

A motor 7 designed as an electric motor is arranged in the first housing part 3 and is provided for driving a linear adjustment movement of the drive housing 2 along the drive axle A. An end, facing away from the first connection element 5, of a protruding drive shaft 8 of the motor 7 is coupled to a coupling device 9. In the exemplary embodiment shown here, the coupling device 9 is designed as an intermediate gear, such that transmission of a torque of the drive shaft 8 is made possible.

Furthermore, the drive device 1 comprises a braking device 10 which is provided for braking an adjustment movement driven by the drive shaft 8. Furthermore, the drive device 1 comprises a first drive element 11 designed as a spindle rod and a second drive element 12 designed as a spindle nut, which are in threaded engagement with one another such that a rotational movement, driven by the drive shaft 8 and transferred via the coupling device, of the first drive element 11 is converted into a linear movement along the drive axle A. The coupling device 9 is, expediently, arranged between the drive shaft 8 and the spindle rod 11. Advantageously, the spindle rod 11 is coupled to the drive shaft 8 of the motor 7 via the coupling device 9, wherein the spindle rod 11 is rotatably arranged in a pivot bearing 13 designed as a ball bearing. The pivot bearing 13 itself is accommodated in a rotationally-fixed manner in the first housing part 3.

The spindle nut 12 is arranged in a rotationally-fixed manner in a guide tube 14 connected to the second housing part 4. A spring part 15 designed as a helical compression spring is arranged radially between the guide tube 14 and the second housing part 4, and is provided for biasing the housing 2, or the first housing part 3 and the second housing part 4, into the extended position. For this purpose, the spring part 15 is clamped axially between the first housing part 3 and the second housing part 4 so that the spring part 15 exerts a force in parallel to the drive axle A.

Figure 2:
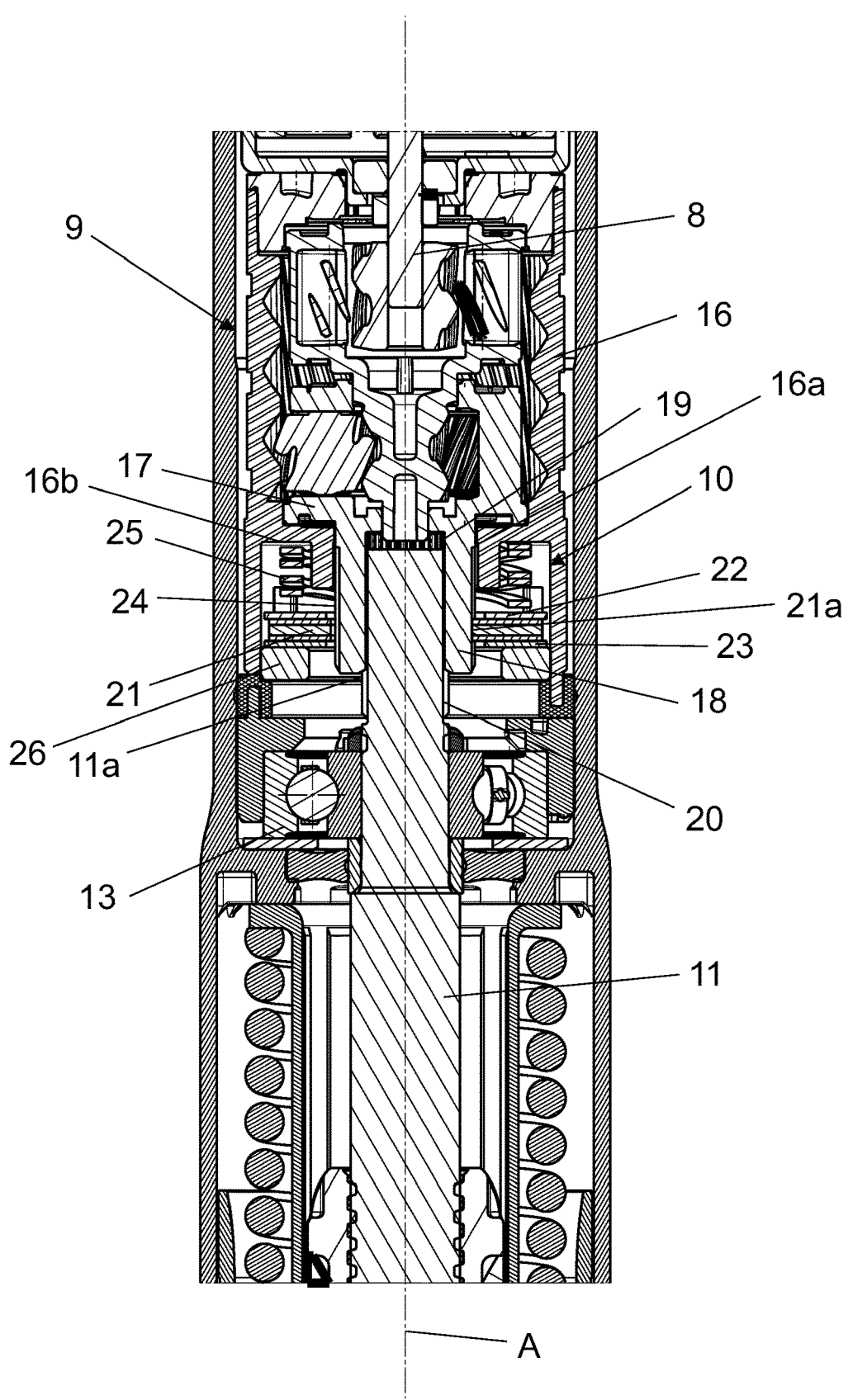
FIG. 2 shows a detail view of the drive device of FIG. 1 in the region of the braking device.

FIG. 2 shows a detailed view of the drive device of FIG. 1 in the region of the braking device 10. In this view, it can be clearly seen that the coupling device 9 comprises a coupling housing 16 and a first coupling part 17 which is arranged facing the spindle rod 11. The first coupling part 17 is rotatably accommodated in the coupling housing 16 and comprises an end-side coupling section 18. In the exemplary embodiment shown here, the coupling section 18 is designed as a hollow-cylindrical extension of the first coupling part 17. The coupling section 18 passes through a central inner bore 16a of the coupling housing 16, wherein the first coupling part 17 is thereby guided radially in the coupling housing 16.

The first coupling part 17 is coupled in the coupling section 18 in a rotationally-fixed manner to the spindle rod 11 via a counter coupling section 11a, which is provided at the end side on the spindle rod 11. For rotationally-fixed coupling of the spindle rod 11 to the first coupling part 17, the coupling section 18 of the first coupling part 17 has, along its inner diameter, an inner spline 19, which is in engagement with an outer knurling 20 provided in the counter coupling section 11a of the spindle rod 11. Advantageously, the spindle rod 11 can simply be inserted into the coupling section 18 of the first coupling part 17, and a reliable, rotationally-fixed coupling between the spindle rod 11 and the first coupling part 17 can thus be achieved.

The braking device 10 comprises a first brake element 21 which is rotatable in relation to the coupling housing 16 and is arranged on the first coupling part 17 in a rotationally-fixed but axially-displaceable manner. Furthermore, the braking device 10 comprises a second brake element 22, which is rotationally-fixed but axially-displaceable in relation to the coupling housing 16, and a third brake element 23, which is rotationally-fixed but axially-displaceable in relation to the coupling housing 16. The first brake element 21, the second brake element 22, and the third brake element 23 are designed as brake disks. In the exemplary embodiment shown here, the first brake element 21 is arranged axially between the second brake element 22 and the third brake element 23.

An outer spline 24 is provided on an outer circumference of the coupling section 18 and is provided for rotationally-fixed coupling of the first brake element 21 of the brake arrangement 10 to the first coupling part 17. The first brake element 21 designed as a brake disk has an internal toothed ring 21a which fits the outer spline 24 and is in engagement with the outer spline 24 of the coupling section 18. Advantageously, the first brake element 21 is thereby arranged in a rotationally-fixed but axially-displaceable manner on the coupling section 18 of the first coupling part 17.

The second brake element 22 and the third brake element 23 are arranged to be rotationally-fixed but axially-displaceable, in relation to the coupling housing 16, on the coupling section 18 of the first coupling part 17. The first brake element 21 is arranged between the second brake element 22 and the third brake element 23. The braking device 10 further comprises a biasing means 25 which biases the brake elements 21, 22, 23 against one another and thus determines the braking force on the first coupling part 17 or the spindle rod 11. The biasing means 25 is designed as a disk spring. Advantageously, it is designed to be very compact and is sufficiently reliable for adjusting the required biasing force.

The biasing means 25 is arranged axially between an annular bottom 16b, arranged in the region of the opening 16a, of the coupling housing 16 and the brake elements 21, 22, 23. A cover element 26 is arranged at an open end, facing the pivot bearing 13, of the coupling housing 16. The brake elements 21, 22, 23 are arranged axially between the cover element 26 and the biasing means. Advantageously, the cover element 26 acts as a stop surface, which is inserted into the open end of the coupling housing 16 during the assembly of the drive device and is thereby pressed into the coupling housing 16 far enough that an intended biasing of the brake elements 21, 22, 23 is achieved under the action of force of the biasing means 25.

The cover element 26 is radially enclosed by the coupling housing 16. The cover element 26 consists of a plastic that is non-transparent to laser, and the coupling housing 16 consists of a laser-transparent plastic. Advantageously, the cover element 26 is connected to the coupling housing 16 by laser welding. Advantageously, the biasing of the biasing means 25, and thus the friction between the brake elements 21, 22, 23 that determines the braking force, can be adjusted very precisely by inserting the cover element 26 into the open end of the coupling housing 16, and can be permanently set by laser welding from the outside through the coupling housing 16.

The advantage in the above exemplary embodiment of a drive device according to the present disclosure is, in addition to the reduction of the residual installation length or the technical length, that the spindle rod 11 experiences a lower modulation, since the distance between the coupling section 18, in which the spindle rod 11 is supported at the end side, and the ball bearing 13 is likewise reduced. In addition, the overall tolerances of the coupling device and of the braking device can be adjusted together such that the tolerances are reduced overall.

The present disclosure has been explained above with reference to an exemplary embodiment in which the braking device 10 is designed as a multi-disk brake with three brake disks, wherein the biasing takes place mechanically via a disk spring 25. It is understood that the braking device can also be designed as an electromechanical brake. In any case, the braking device is arranged axially completely in the coupling section of the coupling device for coupling to the first drive element, so that no additional installation space is required for the braking device in the direction of the drive axle, and the residual installation length is as low as possible.

What is claimed is:

1. A drive device, in particular for an adjustable vehicle flap, comprising
a housing, wherein the housing extends axially along a drive axle,
a motor for generating a driving force in a direction of the drive axle,
a first drive element,
a coupling device arranged between the motor and the first drive element, wherein the coupling device comprises a coupling housing consisting of a laser-transparent plastic and at least one first coupling part with a coupling section for coupling to the first drive element, wherein the first drive element is coupled to the coupling device via the coupling section of the first coupling part, wherein the coupling section is designed as a hollow-cylindrical extension of the first coupling part, and
a braking device for braking a drive movement of the first drive element,
wherein the braking device is arranged axially completely in the coupling section of the first coupling part,
wherein a cover element is arranged at an open end of the coupling housing, wherein the cover element is designed as a stop part for the braking device, which is delimited on one side in the direction of the drive axle by the cover element, wherein the cover element is designed as an injection-molded part made from a plastic that is non-transparent to laser and has a smaller outer diameter than the hollow-cylindrical coupling housing, wherein the cover element is inserted into the open end of the coupling housing and is fixed to the coupling housing by laser welding.

2. The drive device according to claim 1, wherein the braking device radially surrounds the coupling section.

3. The drive device according to claim 1, wherein the braking device comprises a first brake element, wherein the first brake element is mounted in the coupling housing rotatably about the drive axle.

4. The drive device according to claim 3, wherein the braking device comprises a second brake element, wherein the second brake element is arranged in a rotationally-fixed manner in the coupling housing and is coupled in a force-locking manner to the first brake element for generating a braking force.

5. The drive device according to claim 4, wherein the braking device comprises a biasing means, which biases the first brake element and the second brake element axially against one another.

6. The drive device according to claim 5, wherein the biasing means is designed as a disk spring.

7. The drive device according to claim 3, wherein the first brake element in the coupling section is coupled in a rotationally-fixed manner to the first coupling part.

8. The drive device according to claim 7, wherein the first brake element is mounted together with the first coupling part rotatably about the drive axle in the coupling housing.

9. The drive device according to claim 3, wherein the first brake element is designed as a brake disk.

10. The drive device according to claim 1, wherein an inner spline is provided in the coupling section of the first coupling part for coupling to the first drive element and an outer spline is provided for coupling to the braking device, preferably to the first brake element.

11. The drive device according to claim 10, wherein the inner spline is provided on an inner circumference of the hollow-cylindrical first coupling part, and the outer spline is provided on an outer circumference of the hollow-cylindrical first coupling part.

12. The drive device according to claim 11, wherein the first brake element has an internal toothed ring, wherein the internal toothed ring meshes with the outer spline of the first coupling part.

13. The drive device according to claim 10, wherein he first drive element has a counter coupling section and the counter coupling section is coupled to the coupling section of the first coupling part.

14. The drive device according to claim 13, wherein an external knurling is provided in the counter coupling section of the first drive element, wherein the external knurling of the counter coupling section of the first drive element is in engagement with the inner spline of the coupling section of the first coupling part.

15. The drive device according to claim 13, wherein the counter coupling section is arranged at a first end of the first drive element.

16. The drive device according to claim 1, wherein the first drive element is designed as a spindle rod.

17. The drive device according to claim 1, wherein the coupling device is designed as an intermediate gear.

18. The drive device according to claim 17, wherein the first coupling part is designed as a gearwheel which is arranged on a side, facing the first drive element, of the intermediate gear so that an output-side torque can be transferred to the first drive element by coupling the first coupling part to the first drive element.

* * * * *